Aug. 20, 1963   E. C. LLOYD ETAL   3,100,912
DUAL-WEDGE HIGH-PRESSURE APPARATUS
Filed Sept. 29, 1961   3 Sheets-Sheet 1

INVENTORS
Edward C. Lloyd
Daniel P. Johnson
Ulric O. Hutton
BY *Daniel Robbins*
ATTORNEY Aug. 20, 1963  E. C. LLOYD ETAL  3,100,912
DUAL-WEDGE HIGH-PRESSURE APPARATUS
Filed Sept. 29, 1961  3 Sheets-Sheet 3
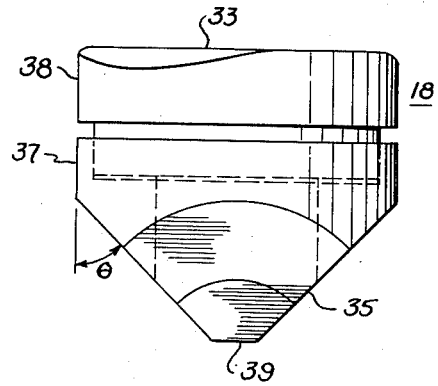
Fig. 4
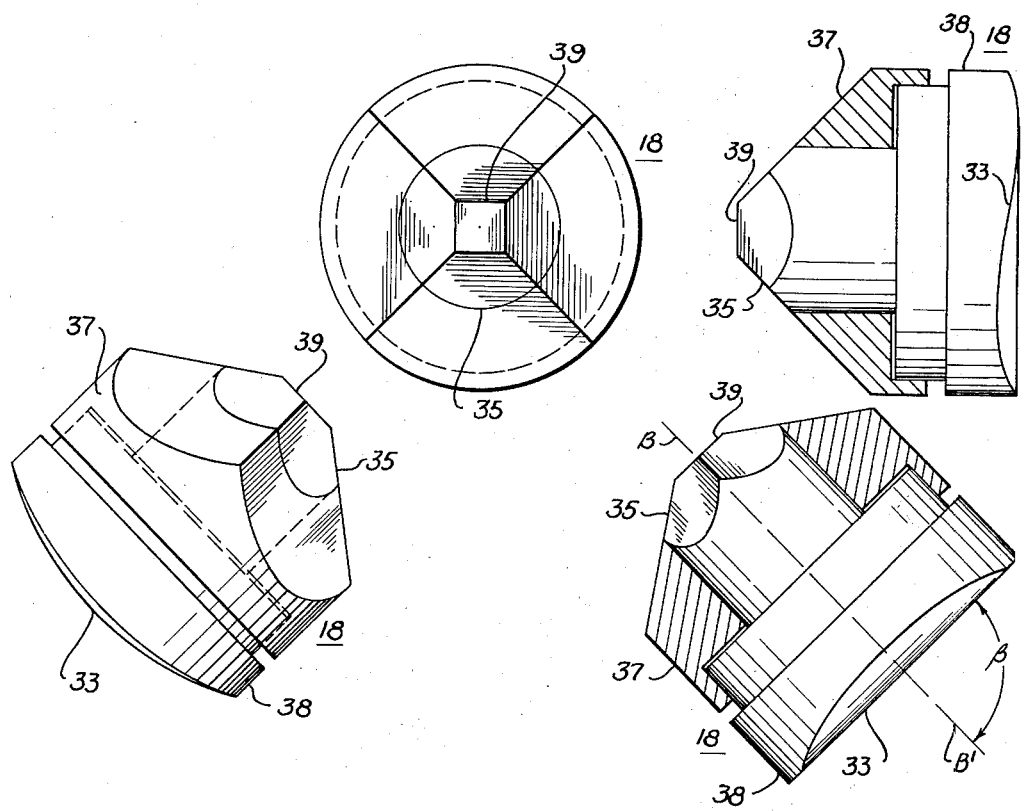
INVENTORS
Edward C. Lloyd
Daniel P. Johnson
Ulric O. Hutton
BY David Robbins
ATTORNEY United States Patent Office 3,100,912
Patented Aug. 20, 1963

3,100,912
DUAL-WEDGE HIGH-PRESSURE APPARATUS
Edward C. Lloyd, Hyattsville, Daniel P. Johnson, Silver Spring, and Ulric O. Hutton, Brinklow, Md., assignors to the United States of America as represented by the Secretary of Commerce
Filed Sept. 29, 1961, Ser. No. 143,015
4 Claims. (Cl. 18—16)

This invention relates to high-pressure apparatus and in particular to a single-acting press using wedge-like action.

A single-acting press employing one inner, tapered surface is described in U.S. patent application Serial No. 4,836, entitled "Multiple-Anvil High-Pressure Apparatus," filed January 26, 1960, by E. C. Lloyd et al., now Patent 3,088,165, granted May 7, 1963. In this press, a first of four anvils is coaxial with a retaining ring having an inner, conically-tapered surface. The remaining three anvils have a conical end resting on the surface; each anvil has a face bearing lightly against one wall of a tetrahedral object. Thus, an axially-directed force applied to the first anvil, because of the wedging action of the tapered surface, will produce simultaneous inward movement of all four anvils, thereby exerting an inward pressure on all walls of the object.

The described press has several disadvantages. For example, the die volume for equal linear dimensions is considerably less than for other forms, such as a cube. The cubic configuration also gives more nearly hydrostatic conditions on the test sample, and the die volume for similar pressure from the same operating force is more than twice that of a tetrahedron.

Accordingly, it is an object of the present invention to provide high-pressure apparatus that may use test samples having more advantageous configurations than a tetrahedron.

Another object is to provide high-pressure apparatus which is simple in construction in that only two different items are used, i.e., a pair of identical cones and several identical anvils.

Another object is to provide a high-pressure press in which the test sample may be loaded and unloaded with greater ease than with conventional presses.

These and other objects are realized in the use of an upper and lower ring positioned between the platens of a press. Each ring has at least one inner, tapered surface, which may be conical in shape. In one embodiment, three anvils are disposed along the tapered surface of the lower ring to form a cavity in which a charge having a cubic configuration is placed; and three other anvils are positioned around the charge to form a cubic die. On closing the press, the last-positioned anvils align themselves along the tapered surface of the upper ring; and the anvils are forced by the tapered surfaces to approach, in identical fashion, the center of the charge which is then compressed in an approximately hydrostatic manner.

For a more complete understanding of the invention, reference is now made to the following description and to the accompanying drawings, wherein:

FIG. 4 is a detail drawing showing several views of an anvil used in FIG. 1.

Figure 1:
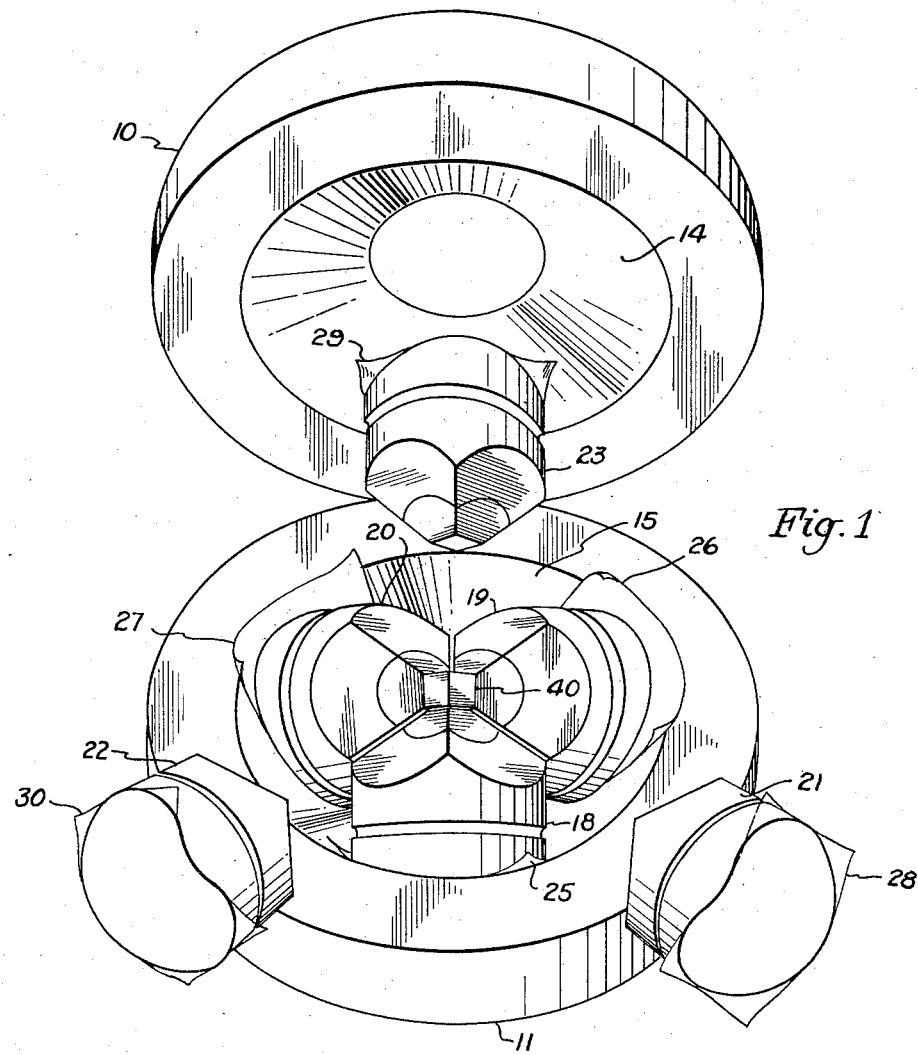
FIG. 1 is an exploded view of one embodiment of the invention.
Figure 2:
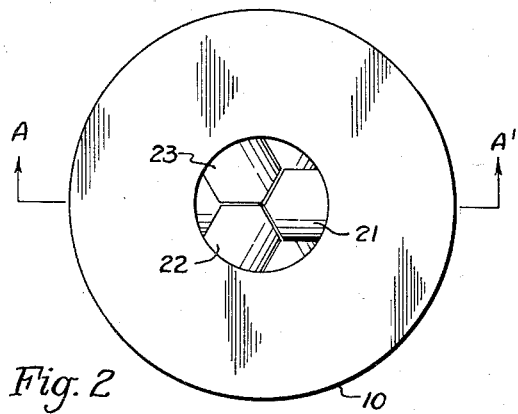
FIG. 2 is an assembled view of the embodiment in FIG. 1.
Figure 3:
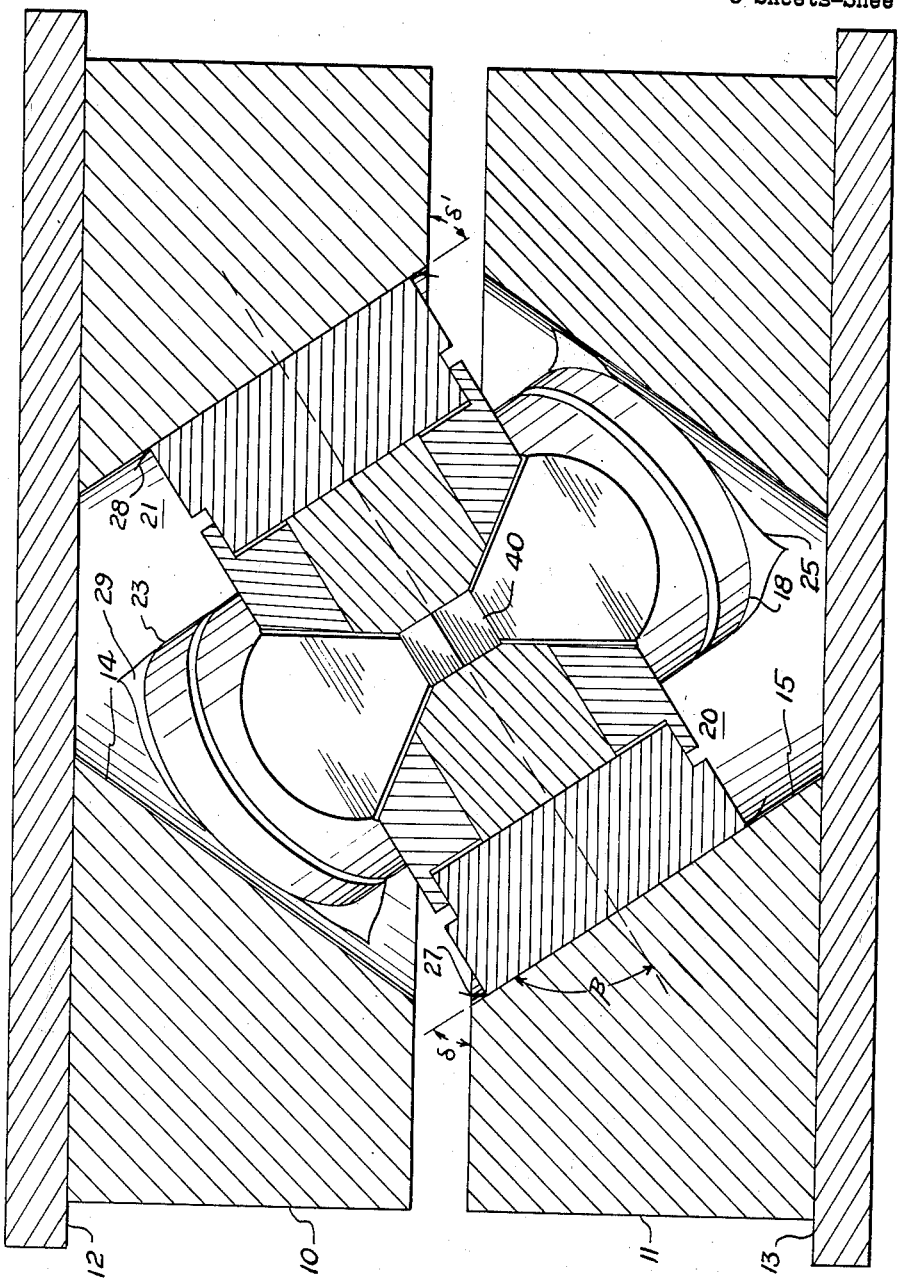
FIG. 3 is a cross-section, not to scale, taken along line A—A' in FIG. 2.

Referring to FIGS. 1 to 3, upper and lower rings 10, 11 are coaxially mounted between platens 12, 13 of a conventional hydraulic press. Rings 10, 11 have inner, conically-tapered surfaces 14, 15, which are shown as continuous, but of course, could be segmented. The conical ends of anvils 18 to 20 are positioned on tapered surface 15; and in operation, the conical ends of anvils 21 to 23 are positioned on tapered surface 14.

To permit free sliding of the conical ends of anvils 18 to 23 over surfaces 14 and 15, bearing sheets of polytetrafluoroethylene are inserted between these faces and the surfaces. Thus, as shown in FIG. 1, bearing sheets 25 to 27 are placed between the conical ends of anvils 18 to 20 and surface 15. Similarly, in operation, bearing sheets 28 to 30 are positioned between the conical ends of anvils 21 to 23 and surface 14. Under the heavy pressures provided in the described apparatus, the bearing sheets serve as an excellent lubricant between the ends of anvils 18 to 23 and surfaces 14, 15. Moreover, sheets 25 to 30 serve to electrically insulate the anvils from rings 10, 11.

Despite the lubricating effect of the sheets, there remains a small frictional force opposing motion of anvils 18 to 23 along the conically-tapered surfaces 14, 15. To overcome this force, the angle between the axis of each cone, defined by surfaces 14, 15, and a line within each surface passing through the apex, i.e., a line segment, is selected to have a value approximately ½ to 1° less than required for the inclination of surfaces 14, 15 to be at right angles to the center axis of each anvil 18 to 23. Thus, angles δ, δ' in FIG. 3 are 55°41'±3', which is 1° less than required for the surfaces to be at right angles to the center axis of each anvil.

The center line of the conical ends of anvils 18 to 23 are tipped about 1° from a line normal to the axis of these anvils in order for the lie of these ends to approximately match the angle of taper of conically-tapered surfaces 14, 15. Thus in FIGS. 3, 4 angle β located between the center axis B—B' of anvil 18 and the center line of conical surface 33 is selected to be 89°.

Each anvil 19 to 23 is substantially identical to anvil 18 shown in detail in FIG. 4. Referring to anvil 18, end piece 35 is received with a hard press fit within a forward bore of binding ring 37, which provides lateral support for the end piece. Pressure disc 38 is received with a close fit within a larger rearward bore of binding ring 37 to make contact with the rear surface of end piece 35. Contact face 39 of the end piece has an area slightly smaller than one side of cubic charge 40 in FIG. 1 and lies in a plane substantially perpendicular to the center axis B—B' of anvil 18. The conical face 33 of pressure disc 38 is machined to have the particular curvature described above. Since the charge in this embodiment is cubic in form, six anvils are employed and angle θ is selected to be 45°±10'.

In operation, bearing sheets 25 to 27 are placed on the conical ends of anvils 18 to 20, respectively, and the anvils are placed on conically-tapered surface 15, as shown in FIG. 1. After the anvils align themselves on the surface, cubic charge 40 is positioned in the cavity formed by the anvils. Anvils 21 to 23 are then disposed about charge 40 so that their contact faces bear lightly against three sides of the charge and the tapered faces of anvils 18 to 23 are parallel but separated a distance determined by the relative areas of a side of charge 40 and contact face 39. Thus, a cubic die is formed in which the center axis of each of anvils 18 to 23 is perpendicular to one face of charge 40. (Anvils 21 to 23 may be held in temporary position by a suitable adhesive material such as sticky wax.)

Bearing sheets 28 to 30 are then placed on the conical ends of anvils 21 to 23, respectively, and pressure is applied to platen 12 by an arrangement not shown. As platens 12, 13 close, anvils 21 to 23 self-position themselves, so that their conical ends rest upon the inner, conically-tapered surface 14. Anvils 18 to 23 are thus constrained and forced to approach, in identical fashion, the center of charge 40, thereby compressing the same in an approximately hydrostatic manner. Some of the excess material in the charge flows between the faces of the anvils to form a gasket constraining the remainder of the charge so that high pressures are retained.

Since the foregoing disclosure relates to only one embodiment of the invention, numerous modifications may be made therein without departing from the spirit and scope of the invention. Rings 10, 11 for example, could be provided with inner-tapered surfaces having any one of a large variety of shapes, such as, three flat sides forming a tapered, triangular surface. The rings could also be used with an appropriate number of anvils in a press for a three-dimensional charge with any one of several configurations, such as, two sets of four symmetrical anvils each having equilateral triangular faces which form a die for an octahedral charge, or two anvils, each having semispherical faces which form a die for a spherical charge. It is therefore to be understood, that within the scope of the appended claims, the invention may be practiced otherwise than as specifically described.

What is claimed is:

1. In a press for a three-dimensional charge, a first and second ring, each having at least one inner, conically-tapered surface, a first group of anvils, each having a conical end located on the surface of said first ring, a second group of anvils, each having a conical end located on the surface of said second ring, each anvil of said first and second group presenting its contact face toward said charge, said first and second ring being positioned so that when urged together said first and second group of anvils tend to slide downward along the surface of said first and second ring, respectively, and means for urging said first and second ring together.

2. In a press for a three-dimensional charge, a first and second ring, each having at least one inner, conically-tapered surface, a plurality of anvils, each having a conical end located on the surface of either said first or second ring, each anvil presenting its contact face toward said charge, the taper of the surface of the first and second ring each being selected to define a geometric cone such that the angle between a line segment and the axis of the cone has a value approximately one-half to one degree less than required for the inclination of the surface to be at right angles to the center axis of each anvil positioned on the surface, the angle between the center axis and the center line of the conical end of each anvil being selected so that the lie of the conical end approximately matches the angle of taper of the surface of the associated ring, said first and second ring being positioned so that when urged together said first and second group of anvils tend to slide downward along the surface of said first and second ring, respectively, and means for urging said first and second ring together.

3. In a press for a three-dimensional charge, a first and second ring, each having at least one inner, conically-tapered surface, a plurality of anvils, each having a conical end located on the surface of either said first or second ring, each anvil having a contact face substantially perpendicular to the center axis of the anvil, each anvil presenting its contact face toward said charge in such a manner that the center axis of the anvil is substantially perpendicular to a respective face of said charge, the taper of the surface of the first and second ring each being selected to define a geometric cone such that the angle between a line segment and the axis of the cone has a value approximately one-half to one degree less than required for the inclination of the surface to be at right angles to the center axis of each anvil positioned on the surface, the angle between the center axis and the center line of the conical end of each anvil being selected so that the lie of the conical end approximately matches the angle of taper of the surface of the associated ring, said first and second ring being positioned so that when urged together said first and second group of anvils tend to slide downward along the surface of said first and second ring, respectively, and means for urging said first and second ring together.

4. In a press for a three-dimensional charge, a first and second ring, each having at least one inner, tapered surface, a first group of anvils, each having an end located on and mating the tapered surface of said first ring, a second group of anvils, each having an end located on and mating the tapered surface of said second ring, each anvil of said first and second group presenting its contact face toward said charge, said first and second ring being positioned so that when urged together said first and second group of anvils tend to slide downward along the surface of said first and second ring, respectively, and means for urging said first and second ring together.

References Cited in the file of this patent
UNITED STATES PATENTS

| | | |
|---|---|---|
| Re. 19,780 | McKay et al | Dec. 3, 1935 |
| 369,784 | Furman | Sept. 13, 1887 |
| 698,115 | Hird | Apr. 22, 1902 |
| 2,125,068 | Dempsey | July 26, 1938 |
| 2,874,414 | Sargent | Feb. 24, 1959 |